July 24, 1923.
R. G. MOORE
1,462,493
AUTOMOBILE HOOD CLAMP
Filed April 4, 1922    2 Sheets-Sheet 1
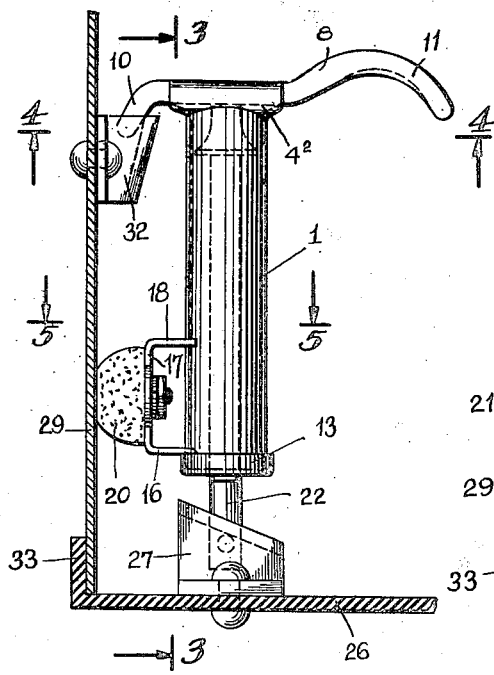
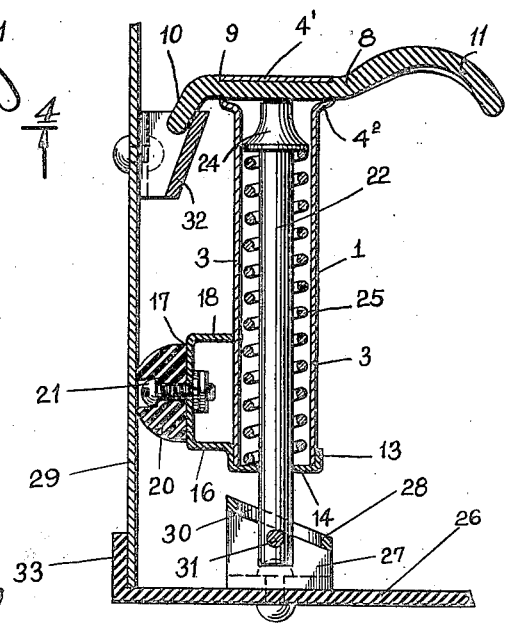
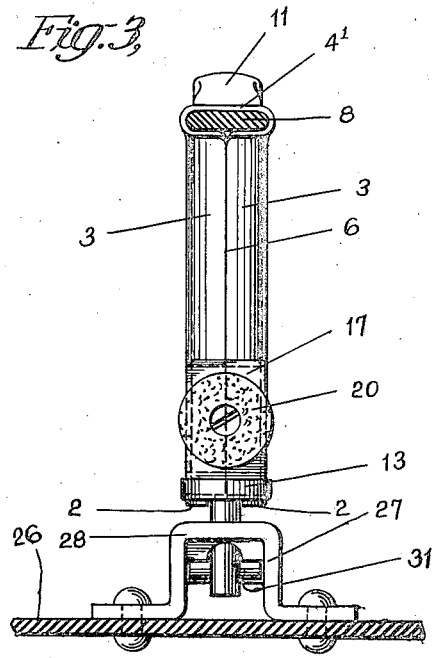
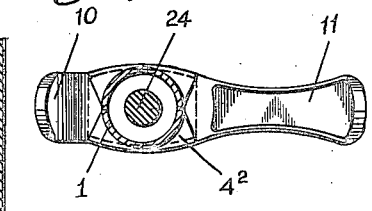
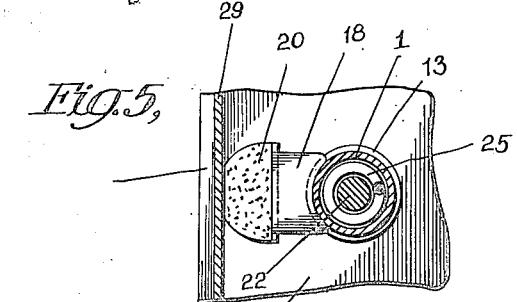
Inventor
Raymond G. Moore
By his Attorneys
Ward, Crosby & Smith July 24, 1923.
R. G. MOORE
AUTOMOBILE HOOD CLAMP
Filed April 4, 1922
1,462,493
2 Sheets-Sheet 2
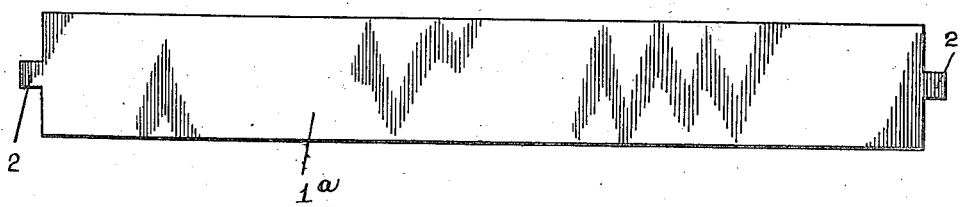
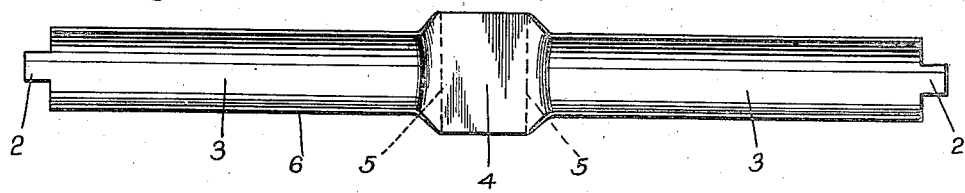
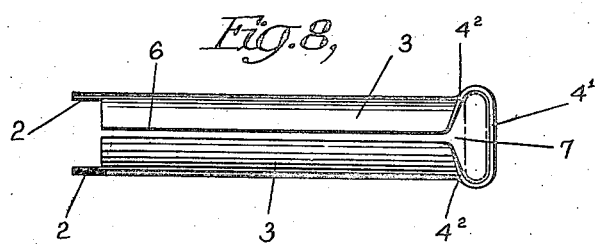
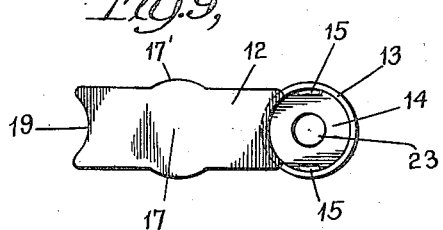 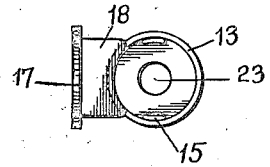

Patented July 24, 1923.

1,462,493

UNITED STATES PATENT OFFICE.

RAYMOND G. MOORE, OF BRIDGEPORT, CONNECTICUT, ASSIGNOR TO THE BASSICK COMPANY, OF BRIDGEPORT, CONNECTICUT, A CORPORATION OF CONNECTICUT.

AUTOMOBILE HOOD CLAMP.

Application filed April 4, 1922. Serial No. 549,463.

REISSUED

*To all whom it may concern:*

Be it known that I, RAYMOND G. MOORE, a citizen of the United States, and resident of Bridgeport, county of Fairfield, and State of Connecticut, have invented certain new and useful Improvements in Automobile Hood Clamps, of which the following is a specification.

The application relates to improvements in automobile hood clamps, and particularly to hood clamps of the character in which a barrel is employed in which operates a spring-pressed plunger.

In such constructions a clamping member referred to as a hold-down clamp is employed, adapted to extend over a bracket on the automobile hood which is to be clamped down upon one of the frame members of the automobile.

In some types of construction, the plunger is pivoted or otherwise secured to the automobile frame member at its lower end, this plunger being pressed upwardly by a spring within the barrel, while the barrel together with the hold-down clamp carried thereby is pressed downwardly by the spring so as to firmly engage the bracket carried by the hood.

The present invention is devised to provide novel features of construction in devices of the character referred to.

In accordance with the invention, a barrel is provided having an integral transverse portion or loop covering its upper end, with transverse openings in the opposite walls of the barrel immediately below this top portion to provide a channel, within which is mounted and secured a metal strap, which, in the preferred form of the invention, is intended to serve both as a hold-down clamp and as a handle member.

With such a construction the barrel may be formed of sheet metal pressed to shape to provide the transverse loop portion referred to at its upper end, the transverse strap forming the hold-down clamp being inserted through the openings beneath the top portion, which openings are formed by the manner in which the construction is pressed to shape, the strap being firmly held in position by having the loop or transverse top portion of the barrel pressed firmly about the same.

Another feature of the invention relates to the attachment to the lower end of the barrel of a bracket or attached member which will serve to hold a side-engagement clamp, and also to provide a bottom closure for the barrel and bearing member for the plunger which extends through the lower end of the barrel.

The object of the invention, broadly speaking, is accordingly to provide a comparatively inexpensive, durable and efficient device of the character referred to, which may be manufactured and assembled simply and economically.

Other objects of the invention relate to the provision of improved details of construction and combinations of elements, all of which will be more fully set forth in the following specification.

In order that the invention may be clearly understood, attention is hereby directed to the accompanying drawings forming a part of this application and illustrating one embodiment of the invention.

In the drawings, Figure 1 represents a clamping device embodying the invention, shown in side elevation, applied to a hood mounted on an automobile frame member, the hood and frame member being shown in vertical section;

Figure 2 is a similar view, the clamping device, however, being shown in vertical section;

Figure 3 is a vertical section taken on the line 3—3 of Figure 1;

Figures 4 and 5 are horizontal sections taken respectively on line 4—4 and line 5—5 of Figure 1, viewed in the direction of the arrows indicated adjacent to lines 4—4 and 5—5, respectively;

Figure 6 is a plan view of a metal blank from which the barrel shown in Figures 1 to 5 may be formed;

Figures 7 and 8 are views showing the blank at stages in the formation thereof;

Figure 9 is a plan view of the blank from which the bottom bracket of the construction is formed;

Figure 10 is a view of the same bracket pressed to shape.

Referring to the drawings, the barrel 1 is preferably formed from a strip of sheet metal, indicated in Figure 6 as $1^a$, this strip having parallel sides with small lugs or ears 2, 2, extending from the opposite ends thereof at points intermediate the side edges.

In the formation of the barrel, the end portions 3, 3 of the blank are first pressed into semi-cylindrical shape, as is indicated in Figure 7, the central or intermediate portion of the blank shown at 4 being left flat as shown. This intermediate portion 4 will, accordingly, be of the same width as the original blank 1ª.

The strip is then bent along the lines 5, 5, which may be located somewhat inwardly from the planes at which the cylindrical portions 3, 3, join the intermediate portion 4, as indicated. The side edges 6 of the semi-cylindrical portions 3 will, accordingly, be brought into parallel relation with each other and fairly close together, as is shown in Figure 8. Also, by this operation, the intermediate portion 4 of the strip is formed into a transverse loop having an outer or top portion 4′ and lower transverse portions 4², which are more or less parallel to the top portion 4′, and which extend upwardly and outwardly from the semi-cylindrical portions 3.

As is apparent, the blank is now provided with a transverse channel indicated at 7 in Figure 8, extending between the top portion 4′ of the transverse loop and the bottom portions 4² of the loop, which constitute flanges extending outwardly from the upper edges of the semi-cylindrical portions 3 of the construction. A metal strip or strap 8 may now be extended through the channel 7 thus provided and secured firmly in position by pressing the top portion 4′ of the transverse loop down against the upper surface of strap 8 and by pressing the bottom flanges 4² firmly against the under surface and side edges of strap 8.

This operation may readily be carried out in a suitable press, which will at the same time bring the side edges 6 of semi-cylindrical portions 3 firmly together to close the barrel.

The upper surface of strap 8 may have a seating recess 9 formed across its end, as is indicated in Figure 2, in which the top portion 4′ of the transverse loop will seat.

The strap 8 may suitably be a metal casting and sufficiently rigid to withstand the usage to which it is subjected. One end portion of the same may be bent downwardly, as is indicated at 10, to form a hold-down clamp, while the other end portion of the strap may be shaped any desired configuration to form a handle portion 11.

The barrel so constructed will be open at its lower end. This end is preferably closed by a bracket which may be formed of the metal strip indicated at 12 in Figure 9. This strip is pressed to shape to provide a short annular flange 13 at one end thereof, the metal of the circular portion 14 within this flange being provided with a pair of oppositely disposed slits 15.

The portion 12 of this strip extending laterally from the annular flange 13 is then preferably pressed into the shape indicated in Figures 1, 2 and 10; that is, the metal of the strip may be pressed horizontally outwards from one side of the annular flange 13, as is shown at 16. From horizontal flange 16 the metal is bent to extend vertically upwards, as is shown at 17, and then again horizontally to provide a top flange 18 parallel to the bottom flange 16.

The annular flange 13 of this bracket may be fitted around and may be slipped over the lower end of barrel 1 and secured thereto very simply by extending the ears 2, 2, at the ends of the semi-cylindrical portions 3 of the barrel through the slits 15 in the bottom portion 14 of the bracket and bending these ears over, as is shown in Figure 3. The bottom horizontal flange 16 will then extend horizontally outwards from the barrel, and the top flange 18 will extend horizontally inwardly into contact with the barrel, the end of flange 18 being curved, as is shown at 19 in Figure 9, so as to bear against the cylindrical surface of the barrel.

The vertical flange 17 of the barrel is preferably provided with outwardly curving side edges, as is indicated at 17′ in Figure 9. A side-engaging clamping member 20, of hard rubber or other suitable material, may be firmly secured against vertical flange 17, as by means of the countersunk set-screw shown at 21.

The completely assembled device is shown in Figures 1, 2 and 3. As there shown, the plunger 22 is slidably mounted within the barrel and extends out through the opening 23 in the bottom portion 14 of bracket member 12. Plunger 22 is provided with a head or enlargement 24 at its upper end and a coiled spring 25 is positioned within the barrel about the plunger with its lower end bearing upon the bottom portion 14 of the bottom closure and its upper end bearing against the end surface of the enlargement 24.

When the device is put in use, the lower end of plunger 22 is secured in some manner to the frame member 26 of the automobile.

I have illustrated a construction in which a bracket 27 is secured to frame member 26, this bracket having a top portion 28 which slants upwardly towards the hood, indicated at 29. This top portion 28 has a slot 30 extending therethrough in the direction of the hood, and the plunger 22 is provided with an enlargement or transverse pin 31 at or adjacent its lower end, which is adapted to bear against the under surface of top portion 28 of bracket 27 on opposite sides of slot 30.

When the hood is to be clamped in position by the use of this device, barrel 1 is raised by means of the handle portion 11 sufficiently to enable the hold-down clamp portion 10 of strap 8 to slip over the bracket 32 secured to hood 29. Spring 25 will then press downwardly on the bottom closure 14 of the barrel and upwardly on plunger 22. Pin or enlargement 31 at the bottom of the plunger, resting in contact with the inclined lower surface of the top portion of bracket 27, will accordingly slide upwardly and inwardly towards the hood until the side clamp 20 rests firmly against the side surface of the hood, pressing the lower end portion of the latter firmly against the vertical flange 33 formed on frame member 26.

It will be understood that the invention is not limited strictly to the arrangements and details of construction which have been particularly described; and also that the various forms of construction described need not necessarily be used together.

The scope of the invention is indicated by the accompanying claims:

1. In an automobile hood clamp, the combination of a barrel having a transverse top portion integral therewith, having upper and lower walls with a channel between the same, and a transverse metal strap extending through said channel and secured thereon.

2. In an automobile hood clamp, the combination of a barrel formed to provide an end closure portion with a transverse opening through the wall immediately below said closure portion, and a strip extending through said opening and transversely from said barrel, the metal of said barrel about said opening being pressed firmly against said strip to hold the latter and close said opening therewith.

3. In an automobile hood clamp, the combination of a hollow cylinder of sheet metal having one end formed into a transverse loop across the top of the cylindrical portion and spaced therefrom, to provide aligned transverse openings between said loop and opposite sides of the end of the cylindrical portion, and a strap extending through said openings and filling the same, the metal of said loop being pressed firmly against said strap to hold the same in position.

4. In an automobile hood clamp, the combination of a hollow cylinder of sheet metal having one end formed into a transverse loop across the top of the cylindrical portion and spaced therefrom, to provide aligned transverse openings between said loop and opposite sides of the end of the cylindrical portion, and a strap extending through said openings and filling the same, the metal of said loop being pressed firmly against said strap to hold the same in position, said strap having one end portion bent downwardly to form a hold-down clamp and the opposite end portion shaped to form a handle.

5. In an automobile hood clamp, the combination of a barrel formed of a sheet metal strip, pressed to shape to provide half cylinders with their edges adjacent to each other and with a loop portion extending across and spaced from said half cylinders, the latter being formed from the end portions of the strip and said loop portion from the intermediate portions of the strip, and a metal strap extending transversely through the openings provided between said half cylinders and loop portion, the latter being pressed down on said strap to hold the latter in position.

6. In an automobile hood clamp, the combination of a barrel member having an open lower end and a member having a cap portion closing said end and an extension at one side of the barrel member, bent laterally and then upwardly and then again inwardly to press against the barrel member, the upwardly bent portion carrying a pad serving as a side engaging clamp member.

7. In an automobile hood clamp, the combination of a barrel member having downwardly extending ears at its lower end, and a member having a flanged cap portion positioned against and about said lower end and provided with openings through which said ears extend, said ears being bent over to hold the same in place, said second named member having an upwardly bent flange at one side of said barrel member, adapted to serve as a side engaging clamp member.

In testimony whereof I have signed my name to this specification.

RAYMOND G. MOORE.